US007905411B2

United States Patent
Ibe

(10) Patent No.: US 7,905,411 B2
(45) Date of Patent: Mar. 15, 2011

(54) BARCODE READING APPARATUS AND READING METHOD

(75) Inventor: Yukiyasu Ibe, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 225 days.

(21) Appl. No.: 12/016,218

(22) Filed: Jan. 18, 2008

(65) Prior Publication Data

US 2008/0173718 A1   Jul. 24, 2008

(30) Foreign Application Priority Data

Jan. 23, 2007   (JP) .................. 2007-012485

(51) Int. Cl.
G06K 7/00   (2006.01)
(52) U.S. Cl. ................................ 235/462.04
(58) Field of Classification Search ............. 235/462.04
See application file for complete search history.

(56) References Cited

U.S. PATENT DOCUMENTS

2003/0201325 A1* 10/2003 Saito ................. 235/462.04
2007/0040034 A1*  2/2007 Hennick et al. ....... 235/462.41

FOREIGN PATENT DOCUMENTS

| JP | 2-53194 | 2/1990 |
| JP | 2-053194 | 2/1990 |
| JP | 11-161757 | 6/1999 |
| JP | 2002-163603 | 6/2002 |
| JP | 2002-304596 | 10/2002 |

* cited by examiner

*Primary Examiner* — Daniel A Hess
*Assistant Examiner* — Tabitha Chedekel
(74) *Attorney, Agent, or Firm* — Young & Thompson

(57) ABSTRACT

All light-emitting devices 71 to 73 are caused to emit lights, and the colored lights by light-emitting devices 71 to 73 are radiated to two-dimensional barcode 10 to read barcode information only of a black pattern by CMOS imager 20. Information corresponding to this barcode information is displayed on display section 90. When a user selects information by using input section 100 from among all the information, a light-emitting device corresponding to the selection is caused to emit a light, and a reading operation is performed.

4 Claims, 3 Drawing Sheets

BARCODE READING APPARATUS AND READING METHOD

This application is based upon and claims the benefit of priority from Japanese Patent Application No. 2007-12485 filed on Jan. 23, 2007, the content of which is incorporated by reference.

BACKGROUND OF THE INVENTION

1. Field of the Invention

The present invention relates to a barcode reading apparatus and reading method for reading barcode information, and more particularly to a barcode reading apparatus and reading method for reading barcode information having a pattern represented in black and multiple patterns represented in colors other than black which are different from one another.

2. Description of the Related Art

There are mainly two kinds of barcode, that is, a one-dimensional barcode and a two-dimensional barcode. Each of them is basically configured in two colors of black and white though the amount of data to be handled is different, and data conversion is performed by reading and binarizing the barcode (symbol).

In many cases, the one-dimensional barcode is used for identifying an article, such as in the case of being read by a POS (Point of Sale) terminal installed at a register of a supermarket and the like.

The number of kinds and the amount of data which can be handled by the two-dimensional barcode is larger than that of the one-dimensional barcode. Therefore, for example, a barcode for the URL of a Website is created to reduce labor of an input operation at a small-sized terminal or apparatus, represented by a mobile phone, or a two-dimensional barcode is used to ensure traceability in manufacturing operations and in physical distribution. Furthermore, with the technological advance of small-sized cameras, a CMOS imager or a CCD camera has been mounted on various portable equipment recently. Thereby, provision of information with the use of the two-dimensional barcode is increasing, including provision by a mobile telephone, and it is often utilized to introduce the URL of a Website.

However, though the two-dimensional barcode is capable of providing a large amount of information for a user, the amount of information which can be provided by one barcode is limited. For example, a barcode that comprises the URL of the Website of a company which sells products can only show the URL of the first page of the Website, and it is necessary to prepare multiple barcodes and to secure sufficient space for displaying the multiple barcodes in order to provide multiple pieces of data such as the URL of a page that is used for product introductions that can be accessed from the first page of the Website, or such as the URL of a page shows a company profile.

Thus, the conventional barcode can represent only one single data irrespective of whether it is one-dimensional or two-dimensional.

Accordingly, a technique which enables one barcode to contain multiple pieces of information by assigning colors to each piece of information and by selectively radiating a light of the color that corresponds to the color coded information when the barcode is read is disclosed, for example, in Japanese Patent Laid-Open No. 1990-53194. In this technique, one barcode is represented in black, red, green and blue, and, by sequentially radiating red, green and blue lights, information having a pattern represented in the red color, information having a pattern represented in green and information having a pattern represented in blue are identifiably read from one barcode.

However, in the conventional technique as described above, information of a pattern represented in red, information of a pattern represented in green and information of a pattern represented in blue are only identifiably read from one barcode. Therefore, a user cannot selectively handle layered information, for example, information of a Website, that is, there remains the problem in which the user cannot extract only the information which he requires from the information that is contained in one barcode.

SUMMARY OF THE INVENTION

The object of the present invention is to provide a barcode reading apparatus and reading method that is capable of extracting specific information, that is required by user, from a barcode that contains multiple items of information.

In order to achieve the above object, the present invention is a barcode reading apparatus for reading barcode information having a pattern represented in black and multiple patterns represented in colors other than black which are different from one another, the barcode reading apparatus comprising:

light emission means configured to be able to selectively radiate lights of the colors of the multiple patterns to the barcode information;

reading means for reading the barcode information in the state during which a light is radiated by the light emission means;

display means for displaying first information corresponding to the barcode information read by the reading means;

input means to which second information selected by the first information displayed by the display means is inputted; and control means for, when all the lights of the colors of the multiple patterns are radiated to the barcode information by the light emission means, and the second information selected by the first information corresponding to barcode information of only the black pattern is inputted to the input means, radiating a light whose color corresponds to the second information to the barcode information by the light emission means.

The above and other objects, features, and advantages of the present invention will become apparent from the following description with reference to the accompanying drawings, which illustrate examples of the present invention.

DETAILED DESCRIPTION OF THE PREFERRED EMBODIMENTS

An exemplary embodiment will be described with reference to drawings.

First, the outline of the exemplary embodiment will be described.

In the present invention, it is necessary to represent multiple pieces of data by one two-dimensional barcode, and the two-dimensional barcode is created with multiple colors to enable it. Here, it is assumed that the colored two-dimensional barcode constituted by multiple colors are printed in red, green and blue, which are the three primary colors of light, and in black on white paper.

An apparatus for reading the two-dimensional barcode emits a light of any of the colors of red, green and blue which is set in advance when reading the two-dimensional barcode. When this colored light is radiated to the two-dimensional barcode, the level of the part of the two-dimensional barcode that is read and that has the same color as the radiated light is lowered because of color assimilation. The part is determined to be "0 (zero)" when the two-dimensional barcode is finally binarized.

For example, if a red light is radiated from the reading apparatus, the part of the two-dimensional barcode other than the red part is determined to be "1" by binarization because the level of the part is read is high, but the part printed in red is determined to be "0 (zero)". If a green light is radiated from the reading apparatus, the background and the part of the two-dimensional barcode other than the green part is regarded as data. Thus, the data to be read differs depending on the color of a light radiated from the reading apparatus even if the barcode is the same.

Thus, it is possible to read different data from one two-dimensional barcode depending on the color of the radiated light, and the ability for information represented by color in the two-dimensional barcode to be read can be improved.

Next, the configuration of this exemplary embodiment will be described.

Figure 1:
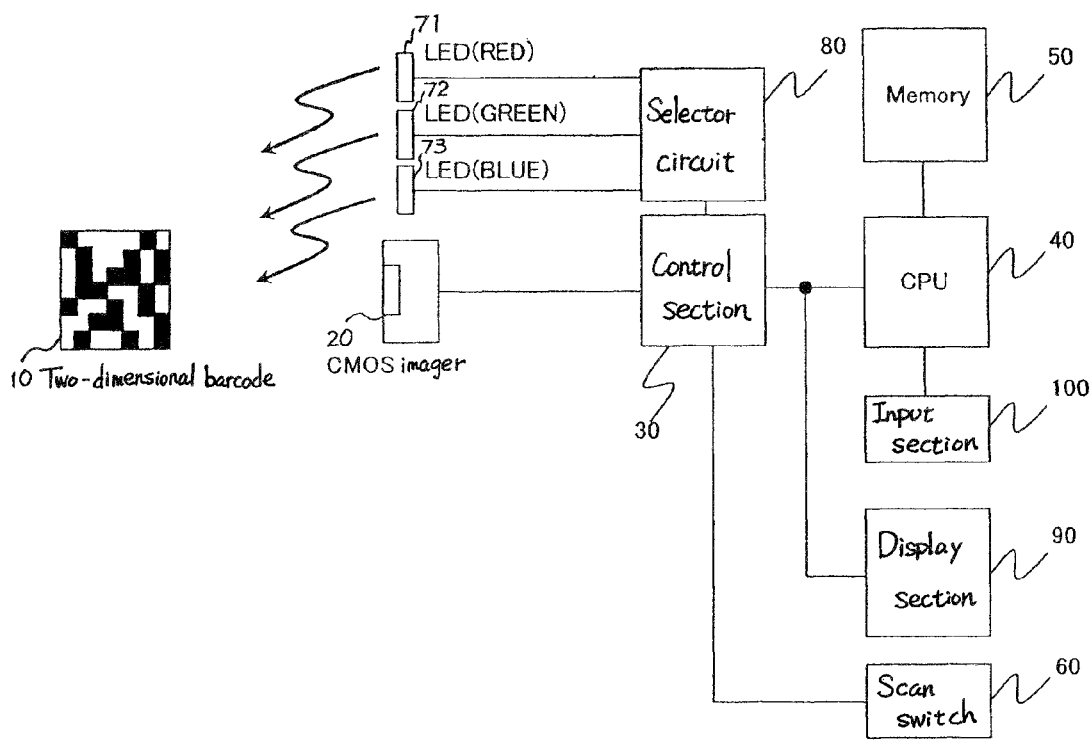
FIG. 1 is a diagram showing an exemplary embodiment of the barcode reading apparatus of the present invention.

FIG. 1 is a diagram showing an exemplary embodiment of the barcode reading apparatus of the present invention.

This exemplary embodiment reads two-dimensional barcode 10 which is to become barcode information, as shown in FIG. 1, and it is configured by three light-emitting devices 71 to 73 which are light emission means, CMOS imager 20 which is reading means, selector circuit 80 for selectively causing light-emitting devices 71 to 73 to emit a light, memory 50, CPU 40, input section 100, display section 90 and scan switch 60.

Two-dimensional barcode 10 is printed and configured in red, green, blue and black. That is, it has a pattern represented in red, a pattern represented in green, a pattern represented in blue and a pattern represented in black.

Light-emitting device 71 emits a red light; light-emitting device 72 emits a green light; and light-emitting device 73 emits a blue light. These lights can be selectively radiated to two-dimensional barcode 10. The on/off switch for managing the light emissions from these light-emitting devices 71 to 73 is controlled by selector circuit 80 operating in accordance with a signal outputted from control section 30.

A CMOS imager that is already available as a product in the market can be used as CMOS imager 20. The operation of reading two-dimensional barcode 10 is controlled by turning on/off scan switch 60, and read data is processed under the control of CPU 40 and control section 30.

Display section 90 is configured by an LCD or the like. Information corresponding to two-dimensional barcode 10 read by CMOS imager 20 is displayed under the control of control section 30.

Input section 100 makes it possible to input new information by selecting information displayed on display section 90. That is, it is possible to perform a selection operation or the next operation with the use of input section 100, with the information displayed on display section 90.

Figure 2:
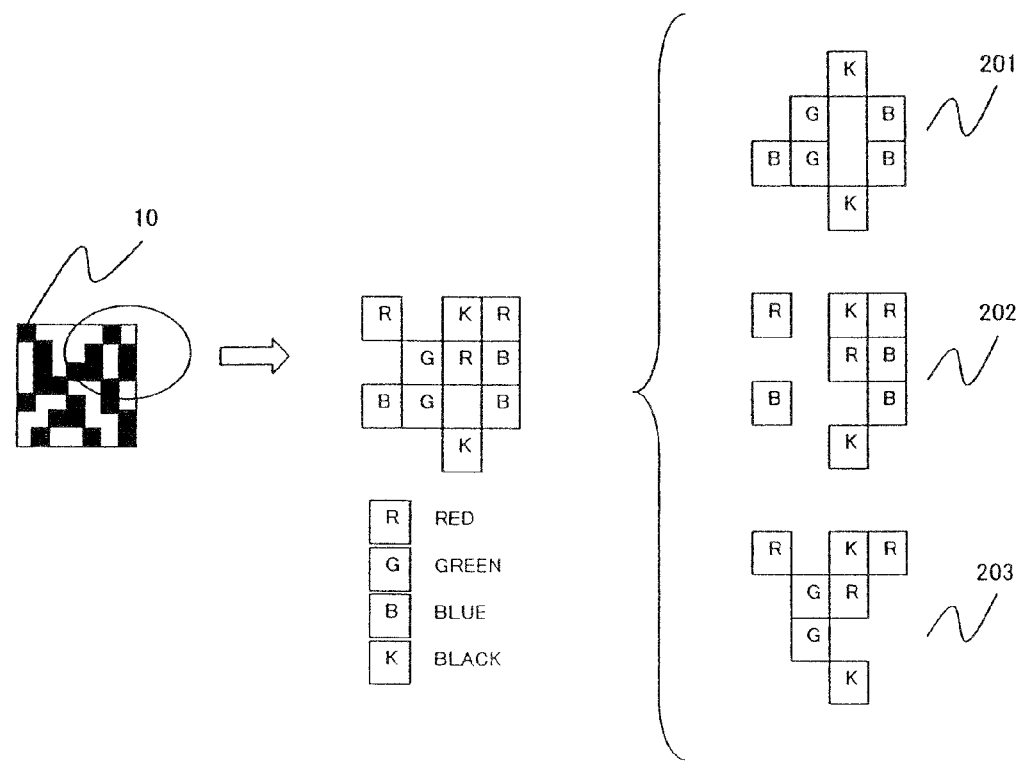
FIG. 2 is a diagram for illustrating the details of a two-dimensional barcode shown in FIG. 1.

FIG. 2 is a diagram for illustrating the details of two-dimensional barcode 10 shown in FIG. 1.

Two-dimensional barcode 10 shown in FIG. 1 is configured in red, green, blue and black as shown in FIG. 2. Two-dimensional barcode 10 is arranged so that information/data can be configured even if two-dimensional barcode 10 lacks only one color among red, green and blue. Furthermore, it is arranged so that information/data can be configured only in black.

Thereby, barcode information that is represented by patterns A to C (201 to 203) which are intended to be data that is different from one another is created. In this exemplary embodiment, it is assumed that pattern A201 is barcode information configured without only the red pattern, pattern B202 is barcode information configured without only the green pattern, and pattern C203 is barcode information configured without only the blue pattern.

The operation of reading two-dimensional barcode 10 by the barcode reading apparatus configured as described above will be described below.

Figure 3:
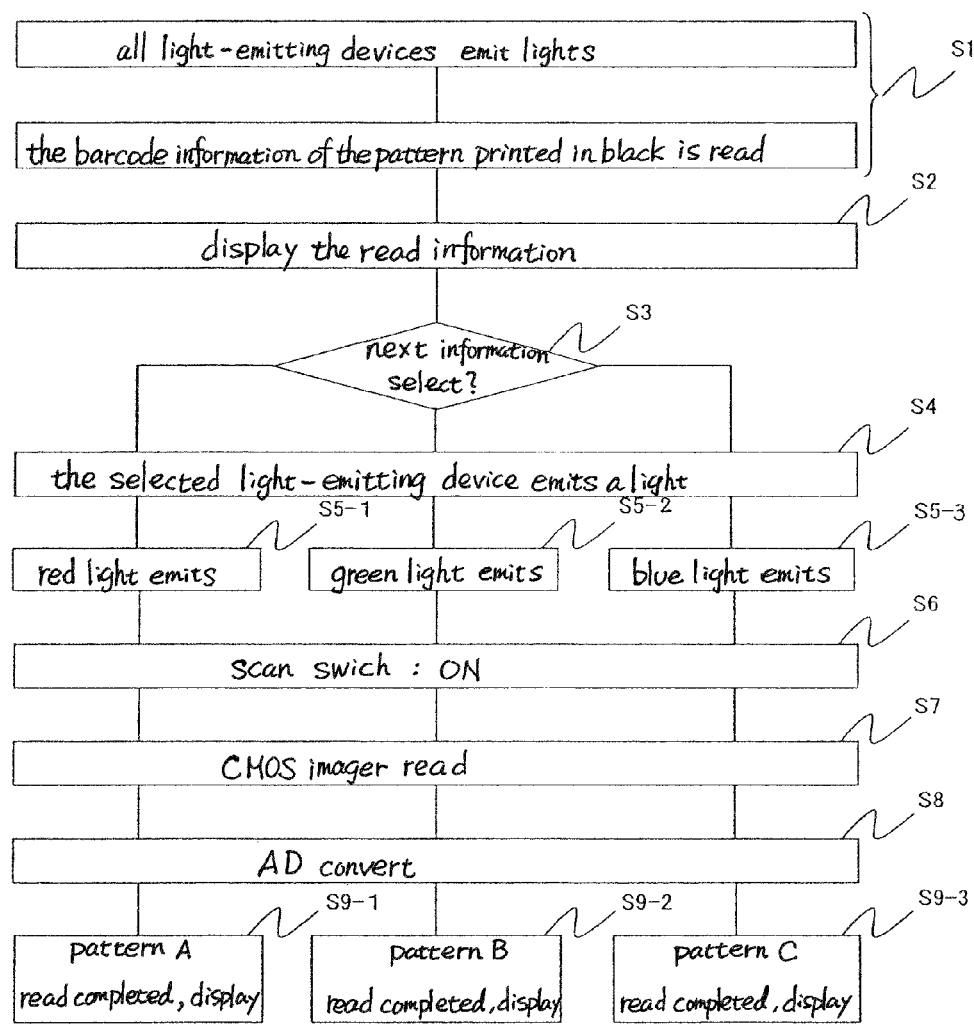
FIG. 3 is a flowchart for illustrating the processing performed when the two-dimensional barcode shown in FIG. 2 is read by the barcode reading apparatus shown in FIG. 1.

FIG. 3 is a flowchart for illustrating the processing performed when two-dimensional barcode 10 shown in FIG. 2 is read by the barcode reading apparatus shown in FIG. 1.

First, at step 1, all light-emitting devices 71 to 73 are selected by selector circuit 80 under the control of control section 30, all light-emitting devices 71 to 73 emit lights, and the lights are radiated to two-dimensional barcode 10. Then, when light-emitting devices 71 to 73 emit red, green and blue light, only barcode information that is represented by the pattern in black in two-dimensional barcode 10 is read by CMOS imager 20.

When the barcode information represented by the pattern printed in black is read by CMOS imager 20, control section 30, CPU 40, memory 50 and the like are involved to display first information corresponding to the barcode information on display section 90 at step 2. The first information displayed on display section 90 is displayed so that a user can select a maximum of six kinds of data, and each kind of data has an input function that enables selection and execution so that the next operation can be performed. At step 3, the user selects information to be accessed by using input section 100 here. In the present invention, the operation of selecting the information is assumed to be input of second information.

In this exemplary embodiment, for convenience, description is made on the flow only for the case of the three colors of red, green and blue. However, intermediate colors (purple, yellow and light blue) which can be generated by simultaneous emission of lights of two colors, a similar operation is performed.

Then, at control section 30, it is determined which of light-emitting devices 71 to 73 is to emit a light, on the basis of the second information selected by the user and inputted by using input section 100, and a signal for causing the light-emitting device to emit a light is outputted. Then, at step 4, a light-emitting device is selected by selector circuit 80 on the basis of the signal, and the selected light-emitting device emits a light. In the case of red, green or blue, the light-emitting device corresponding to the single color is caused to emit a light. In the case of an intermediate color of purple, yellow or light blue, light-emitting devices of two colors which can generate the intermediate color are caused to emit lights.

When the colored light to be emitted is determined, the reading apparatus is held up against two-dimensional barcode 10, and the light is radiated to two-dimensional barcode 10 at steps 5-1, 5-2 or 5-3. Thereby, significant color assimilation is caused at the barcode information printed in the same color as the color of the light-emitting device which has emitted the light.

At step 6, scan switch 60 of the barcode reading apparatus is turned on in this state. Then, at step 7, reading of two-dimensional barcode 10 is performed by CMOS imager 20. In this case, among the red, green and blue patterns constituting two-dimensional barcode 10, the pattern of the color assimilated by the radiated colored light is not read.

Since the data of the pattern read by CMOS imager 20 is analog data, the data of the pattern read by CMOS imager 20 is converted to digital data by control section 30 and CPU 40 at step 8.

At step 9-1, 9-2 or 9-3, reading of the data converted to the digital data as data configured in each color is completed and displayed on display section 90 as new information. Thus, the new information corresponding to the information selected by the user using the first information displayed on display section 90 at step 2 is displayed on display section 90.

In this exemplary embodiment, red, green and blue as the three primary colors of light have been used as an example, as described above. However, in the case of an intermediate color other than these colors, a similar effect can be obtained by adjusting the color tones of the light-emitted color and the colors of two-dimensional barcode 10 to each other. However, even in the case of the three primary colors of red, green and blue, the level is lowered when they are read by a CMOS imager or a CCD camera. Therefore, it is desirable, in the case of an intermediate color, to provide the barcode reading apparatus with a function for changing the threshold for binarizing the level of reading that depends on the colored light to be emitted.

Though the colored light to be radiated to two-dimensional barcode 10 is set each time the reading operation is performed in this exemplary embodiment, the number of kinds of information which can be accessed additionally becomes smaller than six, at a maximum, for example, by continuously radiating red, green and blue lights by light-emitting devices 71 to 73. However, it is possible to further increase the amount of information to be read in comparison with the conventional barcode configured only in black and white. The method therefore is as follows. First, for example, red light-emitting device 71 is caused to emit a light to radiate a red light, and the data of the part of two-dimensional barcode 10 excluding the red pattern. Then, when a stop bit of two-dimensional barcode 10 is detected, the light-emitting device that emits a light is switched from red light-emitting device 71 to green light-emitting device 72, and the data of the part, excluding the green pattern in two-dimensional barcode 10, is continuously read. Furthermore, when the stop bit of two-dimensional barcode 10 is detected, the light-emitting device that emits a light is switched from green light-emitting device 72 to the blue light-emitting device 73, and the data of the part, excluding the blue pattern in two-dimensional barcode 10, is continuously read. Finally, the respectively read data items are merged into one data item.

In the present invention configured as described above, all the lights of the colors of multiple patterns included in barcode information are first radiated by light emission means to barcode information under the control of control means. Then, the multiple patterns, other than a black pattern which are included in the barcode information are not read, and only the pattern represented in black is read by the reading means. First information corresponding to the barcode information only of the read pattern represented in black is displayed on display means. After that, when second information selected from the first information displayed on the display means is inputted to the input means, a light of the color corresponding to the second information inputted to the input means is radiated by light emission means to the barcode information, under the control of the control means. Thereby, information corresponding to the selected second information is read.

As described above, barcode information having a pattern represented in black is read first, and the reading of barcode information corresponding to second information which is selected by a user from first information corresponding to the barcode information is performed. Therefore, it is not possible not only to simply provide a large amount of data or information but also to enable a user to read necessary information as necessary.

While a preferred embodiment of the present invention has been described using specific terms, such description is for illustrative purposed only, and it is to be understood that changes and variations may be made without departing from the sprit or scope of the following claims.

What is claimed is:

1. A barcode reading apparatus for reading a barcode having barcode information with a pattern represented in black, a pattern represented in red, a pattern represented in green, and a pattern represented in blue, the barcode reading apparatus comprising:
    light emission means configured to be able to selectively radiate lights of the colors of red, green and blue to the barcode;
    reading means for reading the barcode information in a state during which a light is radiated by the light emission means;
    display means configured to be able to display first information corresponding to the barcode information read by the reading means;
    input means to which second information selected by the first information displayed by the display means is inputted; and
    control means for, when all the lights of the colors of the red, green and blue are radiated to the barcode by the light emission means, and the barcode information of only the black pattern is read by the reading means, displaying the first information corresponding to the barcode information so that the user can select the second information at the display means, and when the second information is selected and inputted to the input means, radiating a light of the color corresponding to the second information among the red, green and blue to the barcode by the light emission means.

2. A barcode reading apparatus
    for reading a barcode having barcode information with a pattern represented in black, a pattern represented in red, a pattern represented in green, a pattern represented in blue, and intermediate colors among the colors, the barcode reading apparatus comprising:
    light emission means configured to be able to selectively radiate lights of one or two of the colors of red, green and blue to the barcode;
    reading means for reading the barcode information in a state during which a light is radiated by the light emission means;
    display means configured to be able to display first information corresponding to the barcode information read by the reading means;
    input means to which second information selected by the first information displayed by the display means is inputted; and
    control means for, when all the lights of the colors of the red, green and blue are radiated to the barcode by the light emission means, and the barcode information of only the black pattern is read by the reading means, displaying the first information corresponding to the barcode information so that the user can select the second information at the display means, and when the second information is selected and inputted to the input means, radiating a light of the one or two colors corresponding to the second information among red, green and blue to the barcode by the light emission means.

3. A barcode reading method for reading a barcode having barcode information having a pattern represented in black, a pattern represented in red, a pattern represented in green, and a pattern represented in blue, the barcode reading method comprising:
   radiating all the colors of the red, green and blue patterns to the barcode;
   reading barcode information of the black pattern in a state during which the lights are radiated;
   displaying first information so that a user can select second information corresponding to the read barcode information; and
   when the second information is selected from the first information, radiating a light of the color corresponding to the second information among the red, green and blue to the barcode.

4. A barcode reading method for reading barcode information having a pattern represented in black, a pattern represented in red, a pattern represented in green, a pattern represented in blue and intermediate colors among the colors, the barcode reading method comprising:
   radiating all the colors of red, green and blue to the barcode information;
   reading barcode information of the black pattern in the state during which the lights are radiated;
   displaying first information so that user can select second information corresponding to the read barcode information; and
   when the second information is selected from the first information, radiating a light of the one or two colors corresponding to the second information among red, green and blue to the barcode.

* * * * *